United States Patent
Lin (10) Patent No.: US 9,848,539 B2
(45) Date of Patent: Dec. 26, 2017

(54) CONTROL DEVICE OF CUTTING TOOL

(71) Applicant: BOR SHENG INDUSTRIAL CO., LTD., Taichun (TW)

(72) Inventor: Shih-Chang Lin, Taichung (TW)

(73) Assignee: BOR SHENG INDUSTRIAL CO., LTD., Taichun (TW)

( * ) Notice: Subject to any disclaimer, the term of this patent is extended or adjusted under 35 U.S.C. 154(b) by 0 days.

(21) Appl. No.: 14/983,575

(22) Filed: Dec. 30, 2015

(65) Prior Publication Data

US 2017/0105356 A1    Apr. 20, 2017

(30) Foreign Application Priority Data

Oct. 16, 2015   (TW) .............................. 104134077 A (51) Int. Cl.
   *A01G 3/02*      (2006.01)
   *B26B 13/16*    (2006.01)

(52) U.S. Cl.
   CPC ............... *A01G 3/02* (2013.01); *B26B 13/16* (2013.01)

(58) Field of Classification Search
   CPC .......... A01G 3/02; A01G 3/021; A01G 3/025; A01G 3/0475; A01G 3/083; A01G 2003/023; A01G 3/065; B26B 13/26; B26B 13/16; B26B 13/005; B26B 11/003; B26B 13/00; B26B 13/18; B26B 13/20; Y10T 403/60; Y10T 403/606; Y10T 403/7039; G05G 5/005; G05G 5/05; G05G 5/06; G05G 5/08; G05G 5/28
   USPC .................................... 30/173–193, 232–262
   See application file for complete search history.

(56) References Cited

U.S. PATENT DOCUMENTS

| | | | | |
|---|---|---|---|---|
| 2,982,586 A * | 5/1961 | Gliebe | .................. | A01K 77/00 285/921 |
| 3,416,226 A * | 12/1968 | Pfaffenbach | ............. | A01G 3/02 30/261 |
| 4,073,059 A * | 2/1978 | Wallace | .................. | B26B 13/14 30/261 |
| 4,268,963 A * | 5/1981 | Harrison | .................. | A01G 3/02 30/262 |
| 4,341,016 A * | 7/1982 | Harrison | .................. | A01G 3/02 30/262 |
| 5,412,831 A * | 5/1995 | Mongelluzzo | ........... | A46B 7/04 15/144.1 |
| 5,426,857 A * | 6/1995 | Linden | ..................... | A01G 3/02 30/254 |
| 5,774,991 A * | 7/1998 | Shi | ......................... | A01G 3/021 30/254 |
| 6,418,626 B1 * | 7/2002 | Jang | ......................... | A01G 3/02 30/254 |

(Continued)

*Primary Examiner* — Andrea Wellington
*Assistant Examiner* — John E Grosselin, III
(74) *Attorney, Agent, or Firm* — Raymond Y. Chan; David and Raymond Patent Firm (57) ABSTRACT

A control device of a cutting tool is revealed. For performing cutting, opening and closing, the cutting tool includes a pair of handles pivotally connected to each other and each handle having a blade. The control device is set on the handle and involved in opening or closing of the blades of the cutting tool. The control device includes a first component and a second component. The first and the second components are connected to and locked with each other tightly by a fastening structure. The control device is disposed on the handle closely, without loosening from the handle.

5 Claims, 8 Drawing Sheets

(56) References Cited

U.S. PATENT DOCUMENTS

| | | | | |
|---|---|---|---|---|
| 6,546,585 B1* | 4/2003 | Blaustein | ............... | A46B 5/026 |
| | | | | 132/321 |
| 7,497,016 B1* | 3/2009 | Wu | ......................... | A01G 3/02 |
| | | | | 16/429 |
| 8,079,150 B2* | 12/2011 | Huang | .................... | A01G 3/02 |
| | | | | 30/254 |
| 8,266,804 B2* | 9/2012 | Huang | .................... | A01G 3/02 |
| | | | | 30/190 |
| 8,458,912 B2* | 6/2013 | Linden | .................... | A01G 3/02 |
| | | | | 30/131 |
| 9,003,667 B2* | 4/2015 | Huang | .................... | A01G 3/02 |
| | | | | 30/254 |
| 2003/0235463 A1* | 12/2003 | Neumann | ................ | B25G 1/04 |
| | | | | 403/329 |
| 2004/0145198 A1* | 7/2004 | Tomchak | ................. | A01B 1/22 |
| | | | | 294/57 |
| 2006/0191142 A1* | 8/2006 | Jou | ......................... | A01G 3/02 |
| | | | | 30/262 |
| 2007/0266568 A1* | 11/2007 | Lin | ......................... | A01G 3/02 |
| | | | | 30/134 |
| 2008/0184567 A1* | 8/2008 | Jou | ........................ | B26B 13/22 |
| | | | | 30/262 |
| 2009/0064466 A1* | 3/2009 | Henderson | ......... | A44B 11/2549 |
| | | | | 24/190 |
| 2010/0293794 A1* | 11/2010 | Shan | ..................... | A01G 3/065 |
| | | | | 30/261 |
| 2013/0091713 A1* | 4/2013 | Wu | ........................ | B26B 13/16 |
| | | | | 30/254 |
| 2014/0182142 A1* | 7/2014 | Vanttila | .................... | A01G 3/02 |
| | | | | 30/271 |
| 2014/0202007 A1* | 7/2014 | Huang | .................... | A01G 3/02 |
| | | | | 30/262 |

* cited by examiner

CONTROL DEVICE OF CUTTING TOOL

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a control device, especially to a control device of a cutting tool for general use or gardening in which the distance between two handles can be adjusted by the control device. Blades of the cutting device are opened and closed by the handles pivotally connected to each other.

Description of Related Arts

Generally, a cutting tool includes a pair of handles pivotally connected to each other. While the cutting tool is opened, the two handles are separated from each other with a certain distance therebetween. However, users' hands have different sizes. For example, woman's hands are usually smaller than the man's hands. If the distance between the handles is long, the cutting tool is not convenient for women to hold and operate. Thus there are some control devices designed for adjustment of the distance between the handles available now, allowing users apply less force while using the cutting tool.

Refer to Taiwanese Pat No. I273886, an adjustment member for adjusting distance between blades is revealed. A stopper and a corresponding stopped part are disposed on the blades respectively while the blades are pivotally connected to each other. Thus the distance between the two blades can be adjusted precisely according to the width of the user's hand. The stopper and the corresponding stopped part are arranged at a center of the whole structure and hidden within the structure. Thus the adjustment member is protective and practical.

The adjustment member is connected to the cutting tool by screws. Yet such structure has certain shortcomings. For example, the stopper or the screws may become loose and fall off after long term use of the cutting tool. The assembly of the stopper on the cutting tool requires tools.

In order to solve the above problems, there is room for improvement and a need to provide a control device that has the function of the stopper. The control device can be arranged at the cutting tool without using any tools. Thus the speed of assembly of the cutting tool can be accelerated, and the production cost is reduced. Moreover, the control device will not be loosened from the cutting tool easily.

SUMMARY OF THE PRESENT INVENTION

Therefore it is a primary object of the present invention to provide a control device of a cutting tool used for adjustment and operation of the cutting tool. For cutting, closing and opening, the cutting tool includes a pair of handles with blades. The handles are pivotally connected to each other and the control device is arranged at the handle. The distance between the handles has multi-stage adjustment by operation of the control device. The positions of the handles can also be adjusted by the control device to close or open the blades.

In order to achieve the above object, the control device of the cutting tool according to the present invention includes a first component and a second component locked with each other by a fastening structure. The first component has a head part and a rod part formed by extension of the head part. The second component includes a head part and a hollow tube formed by extension of one end of the head part. A fastening part is arranged at the rod part while the hollow tube is disposed with a window. The rod part is inserted into and matched with the shape of the hollow tube while the fastening part is locked by the edge of the window. Thus the first component and the second components are tightly connected to and positioned by each other.

Moreover, the first component is mounted on one side of the handle and tightly connected to the second component to form the control device. The control device will not be loosened from the handle. Thereby the control device is moveable within a limited distance on the handle for adjustment of the distance between the two handles.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1 is an explosive view of an embodiment of a control device according to the present invention;

FIG. 1-1 is a side view of a second embodiment of the embodiment in FIG. 1 according to the present invention;

FIG. 2 is an explosive view of a control device and a cutting tool according to the present invention;

FIG. 2-1 is an enlarged view of a mounting part of the embodiment in FIG. 2 according to the present invention;

DETAILED DESCRIPTION OF THE PREFERRED EMBODIMENT

In order to achieve functions and features of the present invention, please refer to the following embodiments with detailed description and the figures.

Figures 1, 11:
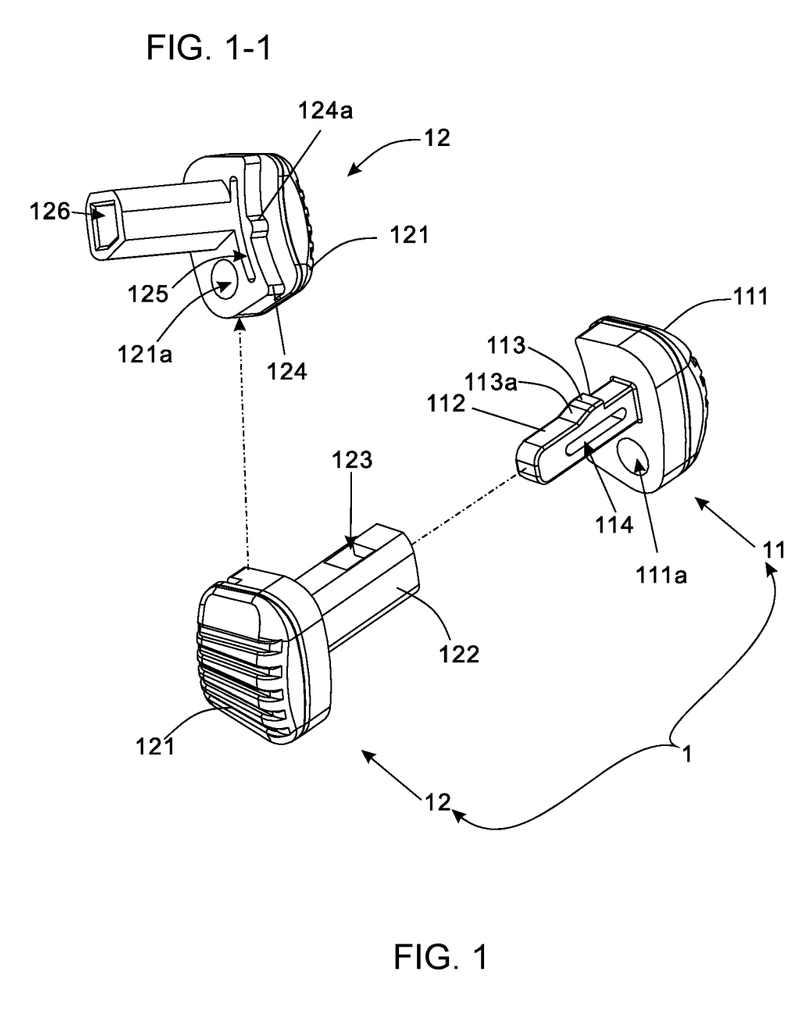
Figures 2, 21:
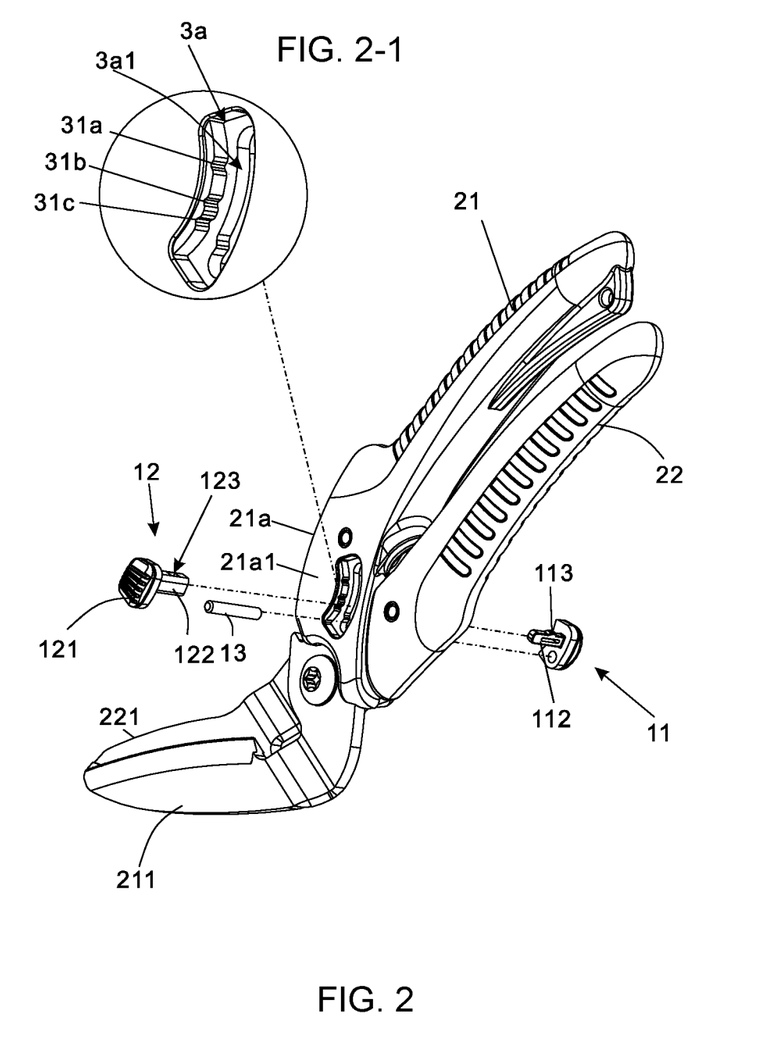
Figure 3:
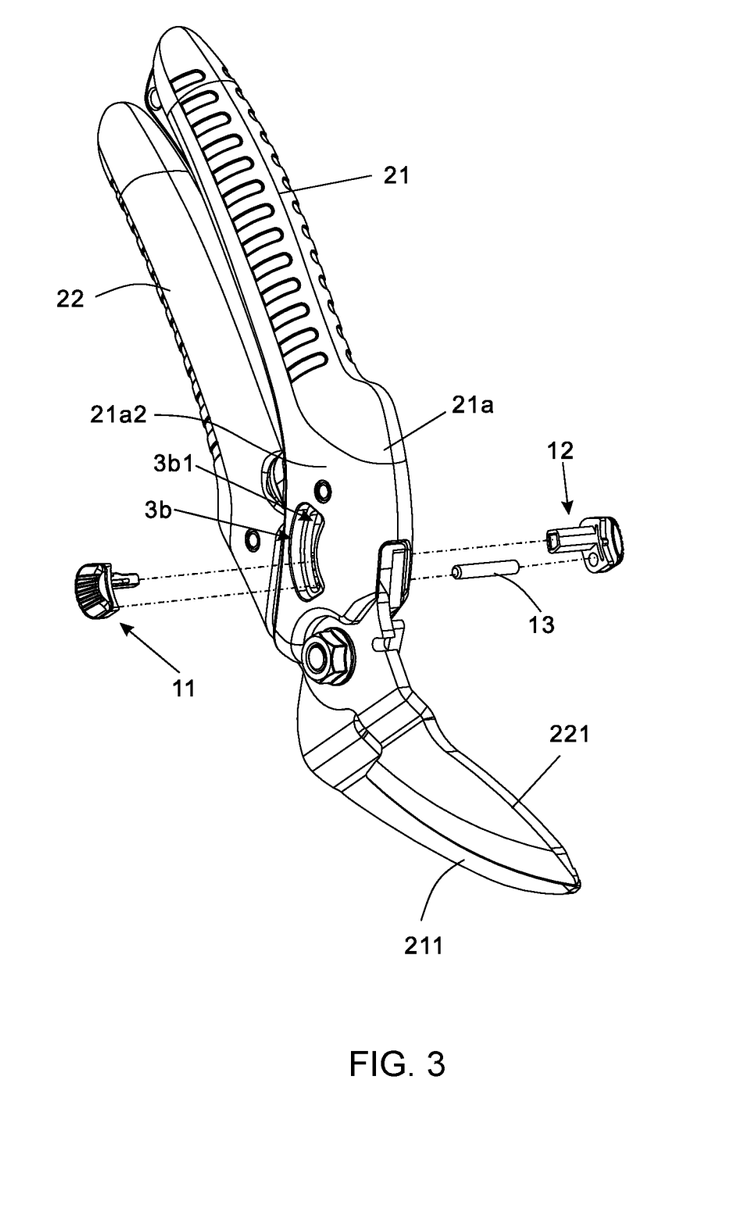
FIG. 3 is another explosive view of a control device and a cutting tool according to the present invention.
Figure 4:
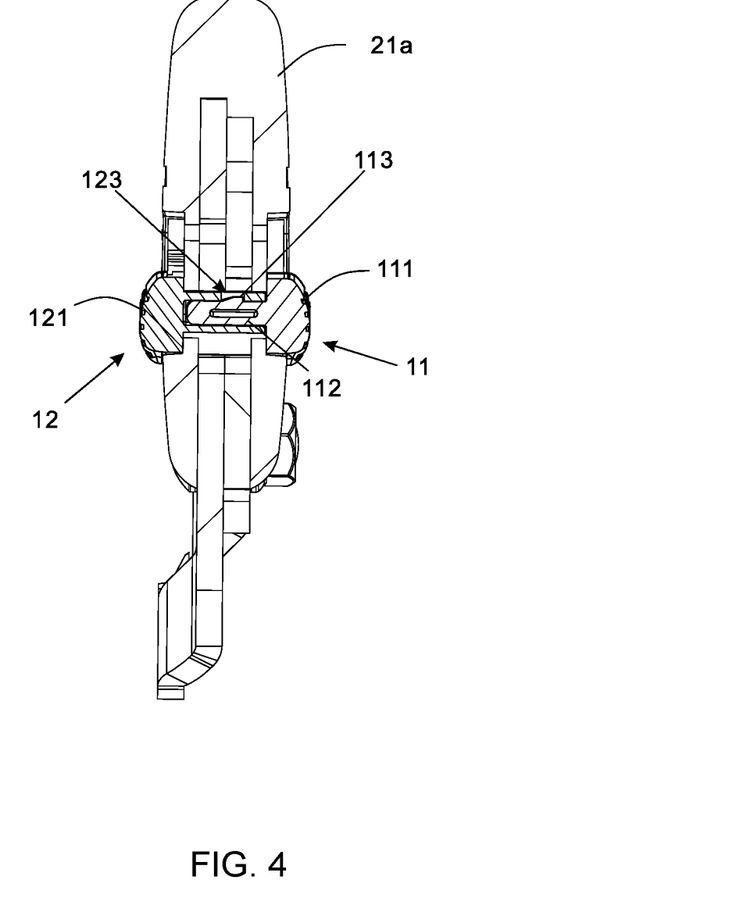
FIG. 4 is a cross sectional view of an embodiment according to the present invention.
Figure 5:
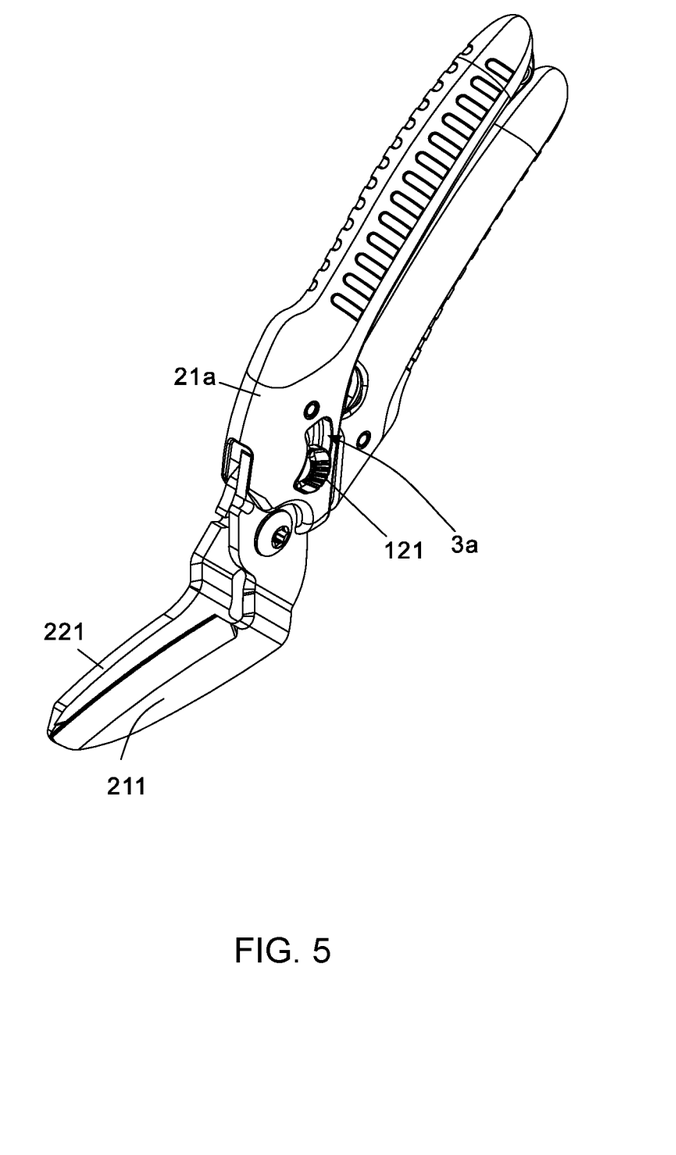
FIG. 5 is a perspective view of an embodiment according to the present invention.

A control device disposed on handles of a cutting tool is revealed. Refer to FIG. 1 and FIG. 2, the cutting tool includes a first handle 21 and a second handle 22 pivotally connected to each other and having a blade 211 and a blade 221 respectively. The present invention features on a control device 1 disposed between the first handle 21 and the second handle 22.

As shown in FIG. 1, the control device 1 consists of a first component 11 and a second component 12. The first component 11 is composed of a head part 111, a pin hole 111a arranged at an inner side of the head part 111, a rod part 112 extended from one side thereof, a fastening part 113 extended and projecting from one side of the rod part 112 and a slot 114 formed in the middle of the rod part 112 and located in relation to the fastening part 113. The rod part 112 is set above the pin hole 111a. The length of the slot 114 is longer than the length of the fastening part 113 while is shorter than the length of the rod part 112. The fastening part 113 is a block having a slope 113a and extended from one side of the rod part 112. The slope 113a is formed between the rear end of the rod part 112 and the inner side of the head part 111. The slot 114 is a longitudinal through hole extended along the rod part 112.

As shown in FIG. 1-1, the second component 12 consists of a head part 121, a hollow tube 122, a window 123, a projecting part 124 extended and projecting from one side of the head part 121, a groove 125 disposed on one side of the projecting part 124, and an opening 126. A stop part 124a is projecting from an edge of the projecting part 124 and a pin hole 121a is arranged at one side of the projecting part 124. The curved groove 125 is arranged beside the projecting part 124 and there is a certain distance between the groove 125 and the stop part 124a so that the stop part 124a can be pressed elastically.

The hollow tube 122 is extended from one side of the projecting part 124 and having the opening 126 on one end thereof. The window 123 is set on onside of the tube wall of the hollow tube 122 and penetrating the tube wall. The shape and width of the window is matched with those of the fastening part 113 of the first component 11. The rod part 112 of the first component 11 is inserted into and matched with the hollow tube 122 of the second component 12 through the opening 126. The fastening part 113 can be pressed elastically by the design of the slot 114. When the rod part 112 is inserted into the hollow tube 122, the fastening part 113 can be pressed by the tube wall and passed through the hollow tube 122 smoothly due to the slope 113a. The fastening part 113 turns back to the original shape to be locked by the edge of the window 123 when the fastening part 113 is reaching the window 123. Thus the fastening part 113 is against the edge of the window 123, without separated each other.

The control device 1 further includes a pin part 13. One end of the pin part 13 is inserted into the pin hole 111a of the first component 11 while the other end thereof is mounted into the pin hole 121a of the second component 12.

The cutting tool includes the first handle 21 whose one end is extended to form a wall part 21a having a first surface 21a1 and a second surface 21a2. The blade 211 is connected to an end part of the wall part 21a and a concave mounting part 3a is arranged at the first surface 21a1 of the wall part 21a. The mounting part 3a is disposed with a track 3a1 that is penetrated through the first surface 21a1 on the wall part 21a of the first handle 21. A concave mounting part 3b is set on the second surface 21a2 of the wall part 21a and having a track 3b1 that is passed through the second surface 21a2 of the wall part 21a. The positions of the mounting part 3a and the mounting part 3b are corresponding to each other and so are the tracks 3a1, 3b1. As shown in FIG. 2-1, there are three indented parts 31a, 31b, and 31c arranged at an upper edge of the mounting part 3a.

Refer from FIG. 2 to FIG. 5, the control device 1 is assembled with the first handle 21 by the following procedures. The rod part 112 of the first component 11 is aligned with the mounting part 3a of the first handle 21 and one end of the pin part 13 is inserted into the pin hole 111a. The rod part 112 is synchronously aligned with the hollow tube 122 and mounted therein. When the rod part 112 is entering the hollow tube 122 and the slope 113a of the fastening part 113 is in contact with the tube wall, the width of the rod part 112 is able to be pressed due to the slot 114 and the slope 113a can enter the hollow tube 122 smoothly. When the fastening part 113 is reaching the window 123, the fastening part 113 is released from and locked with the window 123 and the rod part 112 turns back to the original width. Thus the fastening part 113 is locked by the edge of the window 123. At the same time, the other end of the pin part 13 is aligned with the second component 12 and inserted into the pin hole 121a of the second component 12. The rod part 112 is firmly mounted in the hollow tube 122 and the pin part 13 is tightly pressed and fixed between the two head parts 111, 121. The pin part 13 and the hollow tube 122 are in parallel to each other and a double-rod structure is formed. Thereby the control device 1 is assembled on the first handle 21 and is moveable on the first handle 21.

When the stop part 124a of the second component 12 is moved and adjusted among the indented parts 31a, 31b and 31c, the stop part 124a is a bit pressed downward due to the groove 125. While being moved to one of the indented parts 31a, 31b and 31c of the mounting part 3a, the stop part 124a is released and back to the original shape. Thereby the stop part 124a is against one of the indented parts 31a, 31b and 31c and the control device 1 is temporarily positioned while the stop part 124a is adjusted to the indented part 31a, 31b or 31c required.

Figure 6:
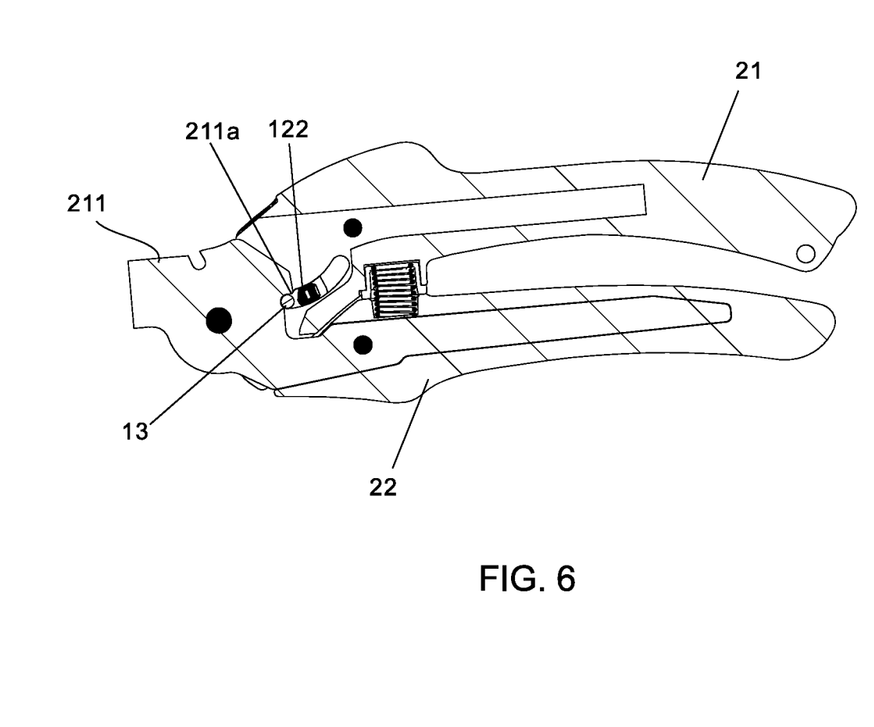
FIG. 6 is a partial sectional view of an embodiment according to the present invention.
Figure 7:
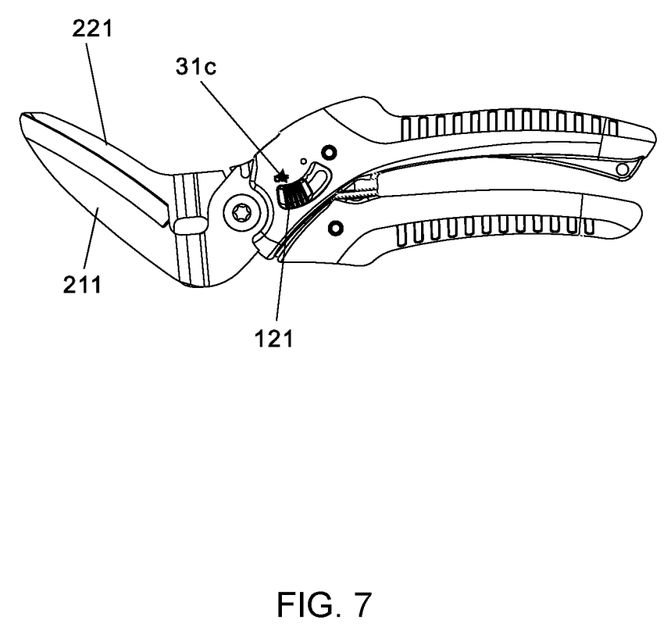
FIG. 7 is a schematic drawing showing an embodiment in use according to the present invention.
Figure 8:
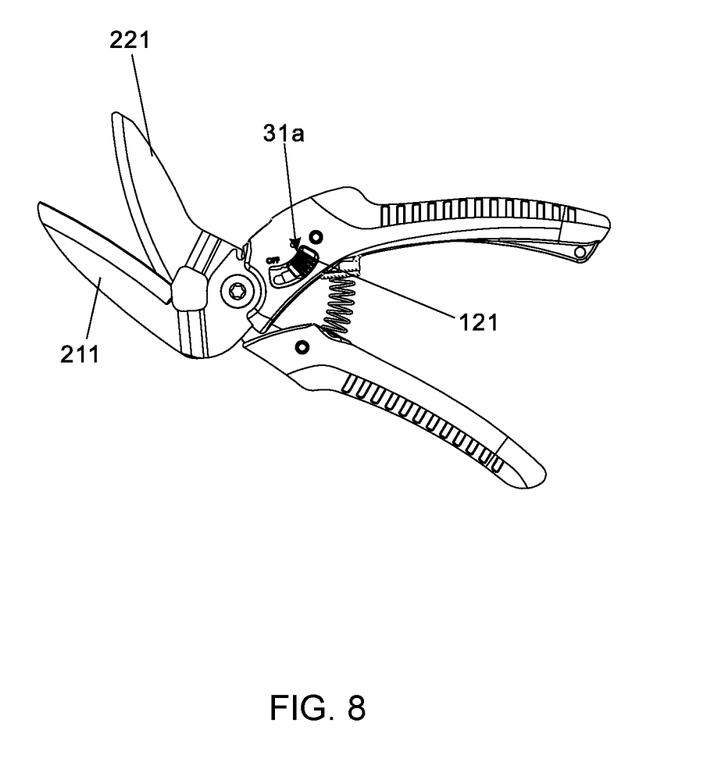
FIG. 8 is another schematic drawing showing an embodiment in use according to the present invention.

For adjusting distance between the first handle 21 and the second handle 22 by using the control device 1, the position of the control device 1 is adjusted among the indented parts 31a, 31a and 31c and the pin part 13 is leaning against a part 211a arranged at an inner end of the blade 211. Refer to FIG. 6, the blades 211, 221 are closed by the pin part 13 leaning against the part 211a. Or the pin part 13 is away from the part 211a for adjustment of the distance between the first handle 21 and the second handle 22 or opening the blades 211, 221. Refer to FIG. 7, the blades 211, 221 are moved to the closed position by the first handle 21 and the second handle 22 and unable to cut when the control device 1 is pushed and moved to the indented part 31c. Refer to FIG. 8, the blades 211, 221 are moved to the open position by the first handle 21 and the second handle 22 and able to cut when the control device 1 is pushed and moved to the indented part 31a. Yet the adjustment of the distance between the first handle 21 and the second handle 22 is not the main feature of the present invention.

In summary, the present invention features on that the control device 1 is formed by the first component 11 and the second component 12 locked with each other tightly. The first component 11 and the second component 12 are assembled with each other easily and locked with each other firmly without using any tool. Thus the assembly is fast and the cost is reduced, without the loosening of the component.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A control device of a cutting tool that is formed by a first handle and a second handle pivotally connected to each other, and blades disposed on the first handle and the second handle respectively comprising: a first component, a second component and a pin part;

wherein the control device is disposed on at least one of the first handle and the second handle;

wherein the first component includes a first head part with a first pin hole arranged at an inner side thereof, a rod part formed by extension of one side of the first head part, a fastening part extended and projecting from one side of the rod part and a slot formed at a middle part of the rod part and located in relation to the fastening part, wherein the rod part is set above the first pin hole, wherein a length of the slot is longer than a length of the fastening part while the length of the slot is shorter than a length of the rod part, wherein the fastening part is a block having a slope and formed by extension of one side of the rod part, wherein the slope is formed between a rear end of the rod part and the first head part, wherein the slot is a longitudinal through hole extended along the rod part;

wherein the second component includes a second head part, a projecting part extended and projecting from one side of the second head part, a hollow tube extended from one side of the projecting part, a groove disposed on one side of the projecting part, an opening located on one end of the hollow tube and a window arranged at one side of a wall of the hollow tube, wherein a stop part is projecting from an edge of the projecting part while a second pin hole is disposed on one side of the projecting part, wherein the groove is arranged beside the projecting part and there is a certain distance between the groove and the stop part so that the stop part is able to be pressed elastically, wherein the window is penetrating through the wall of the hollow tube, wherein a shape of the window is matched with a shape of the fastening part of the first component;

wherein one end of the pin part is inserted into the first pin hole of the first component while the other end of the pin part is mounted into the second pin hole of the second component;

wherein the rod part of the first component is inserted into and matched with the hollow tube of the second component through the opening, wherein the fastening part is able to be pressed elastically due to the slot and thus the fastening part is able to be pressed by the wall of the hollow tube and passed through the hollow tube smoothly due to the slope when the rod part is inserted into the hollow tube and the fastening part is in contact with the wall of the hollow tube, wherein the fastening part turns back to the original shape to be locked by an edge of the window when the fastening part is reaching the window and thus the fastening part is against and locked by the edge of the window and the first component and second component are connected tightly, without loosening.

2. The device as claimed in claim 1, wherein one end of the first handle is extended to form a wall part, wherein the wall part having a first surface and a second surface, wherein the blade is connected to an end part of the wall part and a first concave mounting part is arranged at the first surface of the wall part, wherein at least one indented part is arranged at an upper edge of the mounting part while the mounting part is disposed with a first track, wherein the first track is penetrated through the first surface on the wall part of the first handle, wherein the second surface is disposed with a second concave mounting part, wherein a second track is arranged at the mounting part of the second surface and passed through the second surface of the wall part.

3. A control device of a cutting tool that is formed by a first handle and a second handle pivotally connected to each other, and blades disposed on the first handle and the second handle respectively comprising: a first component, and a second component;

wherein the control device is disposed on at least one of the first handle and the second handle;

wherein the first component includes a first head part, a rod part formed by extension of an inner side of the head part, a fastening part extended and projecting from one side of the rod part and a slot formed at a middle part of the rod part and located in relation to the fastening part, wherein a length of the slot is longer than a length of the fastening part while the length of the slot is shorter than a length of the rod part, wherein the fastening part is a block having a slope and formed by extension of one side of the rod part, wherein the slope is formed between a rear end of the rod part and the first head part, wherein the slot is a longitudinal through hole extended along the rod part;

wherein the second component includes a second head part, a hollow tube extended from an inner side of the second head part, an opening located on one end of the hollow tube and a window arranged at one side of a wall of the hollow tube, wherein the window is penetrating through the wall of the hollow tube and a shape of the window is matched with a shape of the fastening part of the first component;

wherein the rod part of the first component is inserted into and matched with the hollow tube of the second component through the opening, wherein the fastening part is able to be pressed elastically due to the slot and thus the fastening part is able to be pressed by the wall of the hollow tube and passed through the hollow tube smoothly due to the slope when the rod part is inserted into the hollow tube and the fastening part is in contact with the wall of the hollow tube, wherein the fastening part turns back to the original shape to be locked by an edge of the window when the fastening part is reaching the window and thus the fastening part is against and locked by the edge of the window and the first component and second component are connected tightly, without loosening, wherein one end of the first handle is extended to form a wall part, wherein the wall part having a first surface and a second surface, wherein the blade is connected to an end part of the wall part and a first concave mounting part is arranged at the first surface of the wall part, wherein at least one indented part is arranged at an upper edge of the mounting part while the mounting part is disposed with a first track, wherein the first track is penetrated through the first surface on the wall part of the first handle, wherein the second surface is disposed with a second concave mounting part, wherein a second track is arranged at the mounting part of the second surface and passed through the second surface of the wall part, wherein a projecting part is extended and projecting from an inner side of the second component, wherein a stop part is projecting from an edge of the projecting part, and a groove is disposed on one side of the projecting part, wherein the control device is able to be adjusted and temporarily positioned by the stop part being engaged with the indented part.

4. The device as claimed in claim 3, wherein a first pin hole is arranged at an inner side of the first head part of the first component while one side of the projecting part of the second component is disposed with a groove and a second pin hole.

5. The device as claimed in claim 4, wherein a pin part is set between the first component and the second component, wherein one end of the pin part is inserted into the first pin hole of the first component while the other end of the pin part is mounted into the second pin hole of the second component.

\* \* \* \* \*